United States Patent [19]

Parandes

[11] Patent Number: 4,704,001
[45] Date of Patent: Nov. 3, 1987

[54] NOVEL LENS CARRIER

[76] Inventor: Dana J. Parandes, 319 Lansdowne Rd., Warwick, R.I. 02888

[21] Appl. No.: 769,483

[22] Filed: Aug. 26, 1985

[51] Int. Cl.⁴ ............................................... G02B 7/02
[52] U.S. Cl. ..................................... 350/242; 350/321
[58] Field of Search ................ 350/242, 321; 224/191, 224/908; 354/293–295

[56] References Cited

U.S. PATENT DOCUMENTS 2,780,348  2/1957  Harter et al. ......................... 350/242
2,908,198  10/1959  Staudt ................................. 350/242
4,473,177  9/1984  Parandes ............................. 224/191

Primary Examiner—John K. Corbin
Assistant Examiner—Loha Ben
Attorney, Agent, or Firm—Joseph W. Molasky & Assocs.

[57] ABSTRACT

A receptacle for storing and transporting a photographic lens either independently or in combination with a carrying device to which it may be secured. This receptacle is fitted with an end cap to provide a closure means and the interior is lined with a resilient material to provide a cushioning effect.

6 Claims, 3 Drawing Figures

NOVEL LENS CARRIER

This invention relates to an apparatus for storing and transporting a photographic lens.

Specifically, this invention describes a tubular receptacle which may be used alone or as an attachment to a camera-carrying device.

When used in such manner the lens may be transported either independently or with a camera or other photographic equipment.

BACKGROUND

A camera lens can be costly and it is one of the more difficult accessories to maintain and transport.

High resolution photographs depend to a large extent upon the quality of the lens employed and the presence of dust or other particulate matter on the lens surface can result in a photo of diminished quality. Moreover, the ability of a lens to converge rays and focus properly can be impaired by any impact or misuse usually associated with handling and, therefore, it is necessary to give this equipment the care which it deserves.

Moreover, most photographers and hobbyists find it desirable to have on hand during their photo taking sessions a variety of lenses which can be used interchangeably to account for variations in lighting and to achieve various effects. However, there is no apparatus presently available which can be used to maintain, carry or otherwise transport a camera lens either alone or in conjunction with a camera or other photographic equipment.

THE INVENTION

It is an object of this invention to provide an apparatus which can be used to securely maintain and transport a photographic lens.

It is another object to provide a lens carrier in the form of a tubular receptacle which is equipped with closure and cushioning means.

Still another object is to provide a relatively inexpensive means for fabricating the lens carrier of this invention so as to make it available at a reasonable cost.

It is a further object to provide means for releasably securing the lens carrier of this invention to a camera-carrying device so that both types of photographic equipment can be carried in tandem.

These and other objects are accomplished by forming via injection molding techniques three discrete segments which can be combined into a unitary apparatus. These segments consist essentially of two arcuate halves joined together by four self-tapping screws so as to form a tubular receptacle in which one end is open for access purposes. A circular cap engages this opening by threaded or frictional means and thus provides a closed container in which the lens may be safely stored.

A threaded plate, held in place by the mated halves, provides means for joining the lens carrier to a known camera-carrying device.

Structurally then this lens carrier consists of the following elements:

(1) Two elongated and arcuately shaped segments both of which are equipped with top and bottom cowlings. These cowlings, when mated, provide means for joining one segment to the other;

(2) A pretapped plate which is held by the enclosure formed when the top cowling of one segment is joined to the top cowling of the second segment;

(3) A cap which engages the open end of the receptacle formed when the two arcuately shaped segments are joined to one another; and (4) A resilient lining in sheet form which covers the interior of said receptacle.

The pretapped or threaded plate identified as (2) provides means for engaging the screw assembly of the camera-carrying device covered by U.S. Pat. No. 4,473,177.

These and other aspects of the invention will be described in greater detail by reference to The Drawings and The Embodiments.

THE DRAWINGS

THE EMBODIMENTS

The lens carrier of this invention provides means for protecting and transporting a photographic lens. It may be used independently of other equipment or it may be added as an accessory to the carrying device described and claimed in U.S. Pat. No. 4,473,177. This device is shown generally as A in FIG. 1.

Figure 2:
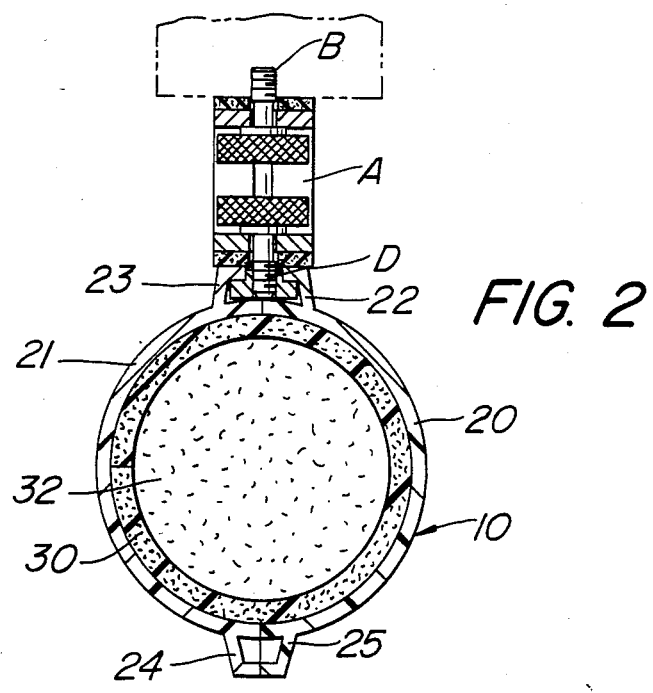
FIG. 2 is a sectional view of the lens carrying case depicted in FIG. 1 shown along line 2—2.

When used as an accessory the lens carrier is attached to the known device A via the screw assembly shown as D in FIG. 2. The precise mode of attachment is described in detail hereinbelow.

Figure 1:
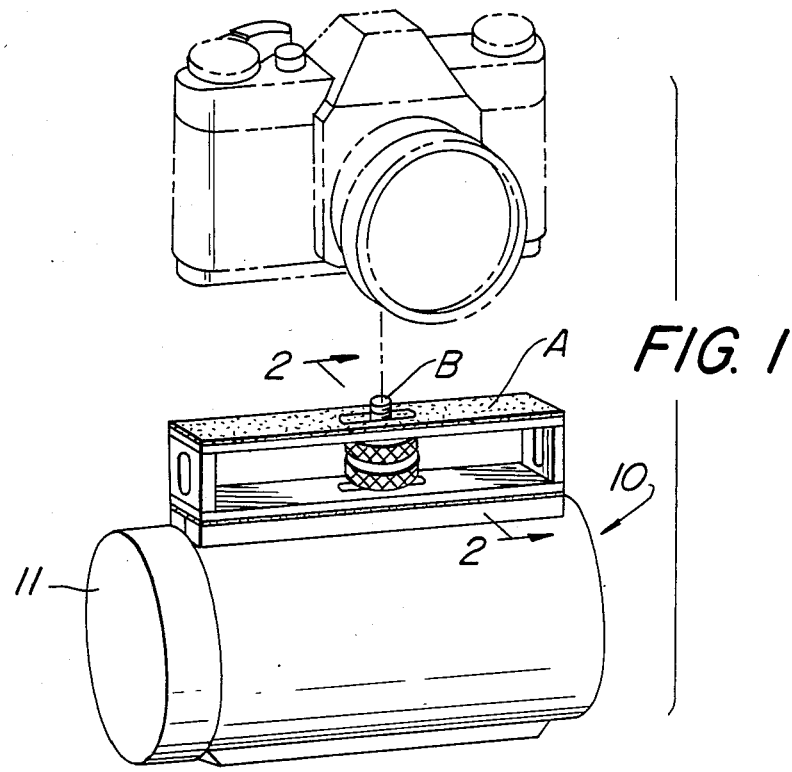
FIG. 1 is a perspective view showing the lens carrying case of this invention mounted to a carrying device.

If desired, a camera or other photographic equipment may also be added by threadedly engaging the screw B with the tripod nut of the camera shown in phantom in FIG. 1.

The lens carrier of this invention is shown generally as 10 in FIG. 1. It consists of two elongated and arcuately shaped segments 20 and 21 which are joined to form a tubular receptacle (FIG. 2), a plate 39 equipped with a threaded bore 42 (FIG. 3) and a cap 11 which covers the receptacle opening. These segments are joined to one another by screws or other suitable securing means and the interior of the receptacle is lined with a resilient material.

The segments 20 and 21 are extrinsically similar but their interior assemblies differ to the extent that segment 21 includes recesses 26 and 27 for accommodating lugs 33 and 34 of segment 20. Accordingly, these items are more complementary than identical.

Segment 21, for example, includes a top cowling 22 equipped with orifices for receiving screws 35 and 36. Conversely, segment 20 contains projecting lugs 33 and 34 into which said screws are threadedly engaged. The engagement of said screws into said lugs not only brings the latter into registry with recesses 26 and 27 but it also brings segments 20 and 21 into registry with one another. The resulting structure is the tubular apparatus shown in section in FIG. 2.

This stepwise assembly has been described by reference to top cowlings 22 and 23 but segments 20 and 21 include bottom cowlings 24 and 25 which are also joined to one another by similar means.

The cowling 25 of arcuate segment 20 (FIG. 2) does not include lugs but it is equipped with threaded bores (Not shown) for receiving screws 37 and 38. Upon engaging said screws the cowling 24 of segment 21 is brought into registry with cowling 25 to provide the tubular structure shown in FIG. 2.

Figure 3:
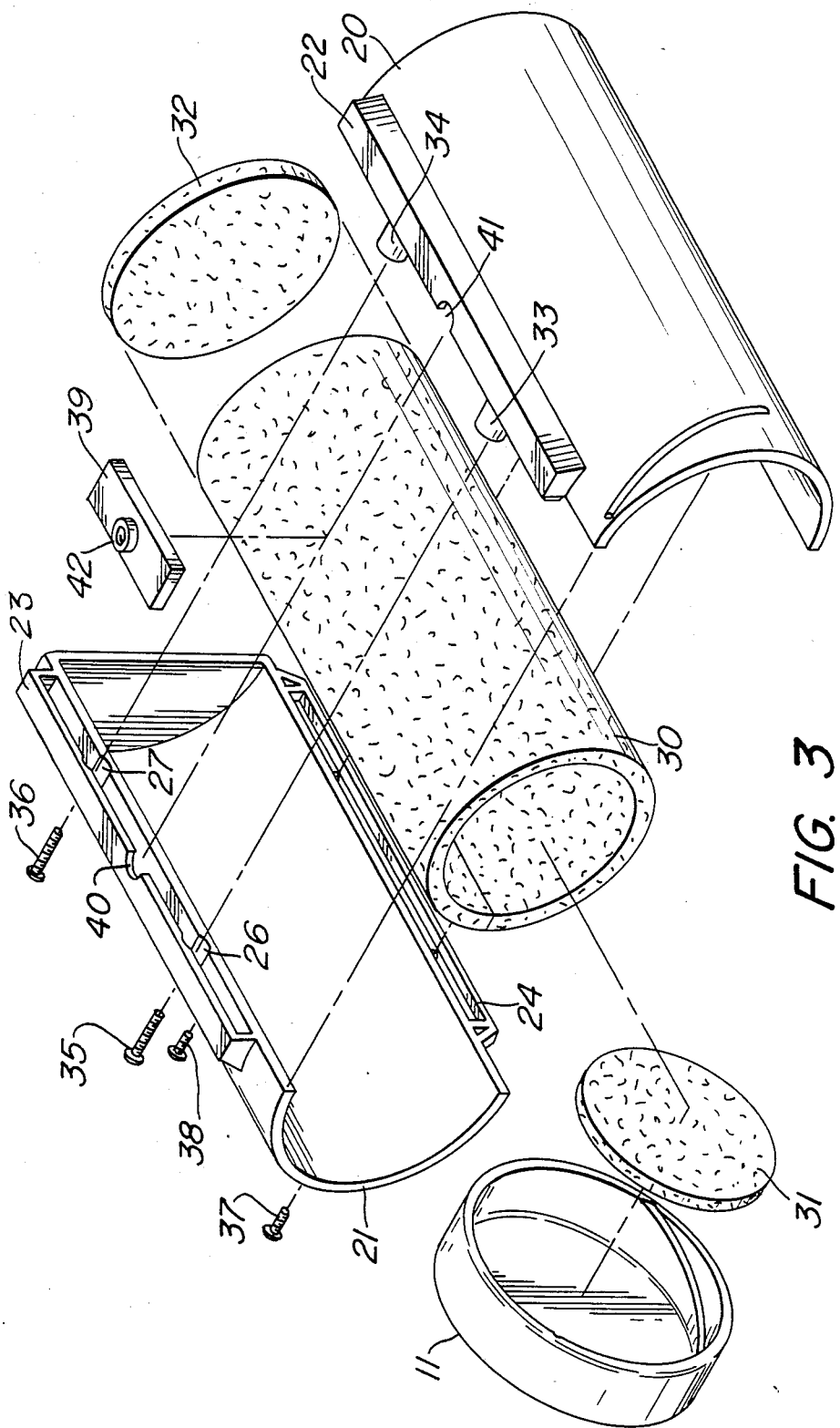
FIG. 3 is an isometric view showing the lens carrying case of FIG. 1 in a disassembled mode.

The lens carrier of this invention is joined to the carrying device identified as A in FIG. 1 by means of a rectangular plate 39 equipped with a threaded bore (FIG. 3). Plate 39 is joined to the tubular structure by the enclosure formed when top cowlings 22 and 23 are brought into secured registry (FIG. 3). These cowlings include semi-circular apertures 40 and 41 which, when brought into juxtaposition, form an orifice into which the threaded bore 42 extends. This construction ensures that the bore 42 will remain centrally aligned within the orifice for engagement with screw D of the carrying device A (FIG. 1).

The lens carrier 10 is lined with a resilient material to ensure that its contents will be safely cushioned. This is achieved by securing to the interior sidewalls contoured sheets of an elastic foam. Any suitably durable and elastic material in sheet form may be employed, as for example, the polyurethane segments identified as 30–32 in FIG. 3.

The lens carrier of this invention may be fabricated from any high impact material which is fluid impervious and which may be injection molded as, for example, polyolefin plastics. To ensure that the lens carrier is waterproof the fluid impervious cap 11 may be secured to the outer peripheral opening either by frictional means or by the threaded engagement shown in FIG. 3.

This invention has been described by reference to precise embodiments but it will be appreciated by those skilled in the art that this invention is subject to various modifications and to the extent that those modifications would be obvious to one of ordinary skill they are considered as being within the scope of the appended claims.

What is claimed is:

1. A tubular shaped lens carrier for attachment to a cameral carrying device which comprises:
    (1) two elongated arcuately shaped segments each having a top cowling and a bottom cowling which, in combination, provide means for joining one segment to the other and which, when combined, form a tubular receptacle having one open end;
    (2) a plate in combination with plate retaining means, said plate including a threaded bore for engaging a screw assembly in a camera carrying device, said plate retaining means consisting essentially of the enclosure formed by joining the top cowling of one segment to the top cowling of the remaining segment;
    (3) a cap which engages the open end of said receptacle; and
    (4) a resilient lining in sheet form which covers the receptacle interior.

2. The lens carrier according to claim 1 wherein said plate retaining means includes an orifice through which said bore engages said screw assembly of the camera carrying device.

3. The lens carrier according to claim 1 wherein the top cowlings of said arcuately shaped segments are joined to one another by screw means and the bottom cowlings of said arcuately shaped segments are joined to one another by screw means.

4. The lens carrier according to claim 1 wherein the lining is comprised of discrete inserts which are contoured to cover the receptacle interior.

5. The lens carrier according to claim 1 wherein said cap and said receptacle are threadedly engaged.

6. The lens carrier according to claim 1 wherein the arcuately shaped segments and cap are formed from high impact plastic.

* * * * *